United States Patent
Fisk (10) Patent No.: US 10,388,032 B2
(45) Date of Patent: Aug. 20, 2019

(54) METHOD AND APPARATUS FOR TILE BASED DEPTH BUFFER COMPRESSION

(75) Inventor: Donald Fisk, Barnet (GB)

(73) Assignee: Imagination Technologies Limited, Kings Langley (GB)

( * ) Notice: Subject to any disclaimer, the term of this patent is extended or adjusted under 35 U.S.C. 154(b) by 1467 days.

(21) Appl. No.: 13/355,862

(22) Filed: Jan. 23, 2012

(65) Prior Publication Data

US 2012/0212489 A1 Aug. 23, 2012

(30) Foreign Application Priority Data

Jan. 21, 2011 (GB) .................................... 1101117.8

(51) Int. Cl.
    *G06T 15/40* (2011.01)
    *G06T 9/00* (2006.01)

(52) U.S. Cl.
    CPC ................ *G06T 9/00* (2013.01); *G06T 15/40* (2013.01); *G06T 2200/28* (2013.01)

(58) Field of Classification Search
    CPC ...... G06T 15/40; G06T 15/005; G06T 15/405
    USPC ................ 345/419, 421, 422, 506, 545, 428
    See application file for complete search history.

(56) References Cited

U.S. PATENT DOCUMENTS

| | | | |
|---|---|---|---|
| 6,961,057 B1 | 11/2005 | VanDyke et al. | |
| 7,277,098 B2 * | 10/2007 | Xu et al. | 345/555 |
| 7,898,550 B2 * | 3/2011 | Prokopenko | G06T 15/405 |
| | | | 345/422 |
| 8,089,486 B2 * | 1/2012 | Anderson | G06T 15/005 |
| | | | 345/506 |
| 8,184,710 B2 * | 5/2012 | Srinivasan | H04N 19/13 |
| | | | 375/240.18 |
| 8,269,769 B1 * | 9/2012 | Voorhies et al. | 345/422 |
| 8,270,736 B2 * | 9/2012 | Wennersten | G06T 9/00 |
| | | | 382/232 |
| 8,311,353 B2 * | 11/2012 | Strom | G06T 9/00 |
| | | | 382/232 |

(Continued)

FOREIGN PATENT DOCUMENTS

| | | |
|---|---|---|
| EP | 1081649 A2 | 3/2001 |
| WO | 2009092454 A1 | 7/2009 |

OTHER PUBLICATIONS

UK Search Report dated May 21, 2011 (2 pages).

(Continued)

*Primary Examiner* — Kimbinh T Nguyen
(74) *Attorney, Agent, or Firm* — Vorys, Sater, Seymour and Pease LLP; Vincent M DeLuca (57) ABSTRACT

A method and apparatus are provided for compressing depth buffer data in a three dimensional computer graphics system. The depth buffer data is divided into a plurality of rectangular tiles corresponding to rectangular areas in an associated image. The number of starting point locations in a tile are identified and a difference in depth value determined between each starting point and depth values of each of at least two further locations. Using this information depth values are predicted at a plurality of other locations in the tile and where these predicated values substantially match an actual depth value at location is assigned to a plane associated with respective starting point. Starting point location depth value difference data and plane assignment data for each tile and locations in the tile not assigned to a plane, then stored.

21 Claims, 10 Drawing Sheets

Compressing a plane that is not at a corner of the tile.

(56) References Cited

U.S. PATENT DOCUMENTS

| | | | | |
|---|---|---|---|---|
| 8,390,619 B1* | 3/2013 | Voorhies et al. | ............. | 345/422 |
| 8,508,544 B1* | 8/2013 | Molnar | ................. | G06T 9/00 |
| | | | | 345/422 |
| 8,692,829 B2* | 4/2014 | Hakura | ................ | G06T 15/50 |
| | | | | 345/422 |
| 8,854,364 B1* | 10/2014 | Voorhies | ............... | G06T 15/40 |
| | | | | 345/419 |
| 2006/0033735 A1* | 2/2006 | Seiler | ................. | G06T 15/40 |
| | | | | 345/421 |
| 2006/0103658 A1* | 5/2006 | Liao | ........................ | 345/545 |
| 2010/0254621 A1* | 10/2010 | Wennersten et al. | ........ | 382/235 |

OTHER PUBLICATIONS

"Efficient Depth Buffer Compression" by Jon Hasselgren et al, Proc. Graphics Hardware, 2006, pp. 103-110.

Wennersten "Depth Buffer Compression", Internet Citation, Jan. 1, 2007, p. 58, XP007917369.

\* cited by examiner

Figure 1 – An 8x8 tile containing two planes.

Figure 2 – Examples of plane's extent fields.

Figure 3 - Compressing a plane that is not at a corner of the tile.

Figure 4 - An Immediate Mode Renderer without Z-Buffer Compression

Figure 5 - An Immediate Mode Renderer with Z-Buffer Compression

Figure 6 - A Tile Based Renderer without Z-Buffer Compression

Figure 7 – A Tile based Renderer with Z Buffer Compression

Figure 8 - Compressing a plane that is not at a corner of the tile.

Figure 9 – Flowchart of serial algorithm.

Figure 10 – Flowchart for deserialization and decompression.

METHOD AND APPARATUS FOR TILE BASED DEPTH BUFFER COMPRESSION

This invention relates to a method and apparatus for compression of tile-based depth buffer and of the type used in a 3-dimensional computer graphics system, to reduce the volume of data being read from and written to memory used for the depth buffer.

BACKGROUND OF THE INVENTION

Three dimensional image computer graphics systems for rendering images are well known. A typical system (e.g. similar to the one represented in FIG. 4) projects and rasterizes polygons 401, and the resulting polygon fragments 402 are sorted in order to determine which are visible to the user and which are hidden. The sorting is typically carried out using a unit known as a depth buffer or z-buffer, 403. Depth or Z buffers are well known to those skilled in the art. Finally, the sorted fragments are written to a frame buffer 407, from where they may be displayed on a screen.

When a polygon is rendered to a frame buffer, the depth (or z-value) of each polygon fragment generated is compared against a current value in a depth buffer at the same location, and the fragment is only rendered, and the value in the depth buffer updated to the depth value of the fragment, if the fragment is found to be closer to the viewpoint than the current value in the depth buffer. As a result, when all polygon fragments have been considered, the depth buffer contains the depths and identities of the fragment closest to, and therefore visible to the viewer, for each pixel position in the frame buffer.

A conventional depth buffer requires a large memory, corresponding to the size of the frame buffer. This memory is typically so large that it must be stored in an external memory attached to the rendering device. A large number of polygon fragments are likely to be tested at each pixel position, leading to a very large number of memory accesses (reads and writes) to the depth buffer memory.

The memory bus connecting the external memory to the rendering device must have sufficient bandwidth to support the large number of accesses. The bus may also be shared with other parts of the system, such as the texturing unit, which will also generate large numbers of memory accesses. A large and fast memory subsystem is expensive, and so it is desirable to reduce the number of memory accesses wherever possible.

Three techniques can contribute towards reducing memory accesses and therefore implementing a depth buffer more efficiently in hardware: tiling, caching and compression.

The scope of this patent is depth buffer compression. In order to put this into context, depth buffer tiling and depth buffer caching, both well-known techniques, are also described. While it is envisaged that the depth buffer compression method would typically be used in conjunction with a cache, this is not a requirement.

In many systems, the frame buffer is subdivided into a plurality of rectangular areas or tiles. Fragments which are determined to be potentially visible in each tile are rendered to that tile. As fragments which do not cover a tile need to be rendered for that tile the number of depth buffer accesses is reduced as described below.

Depth Buffer Tiling

Figure 4:
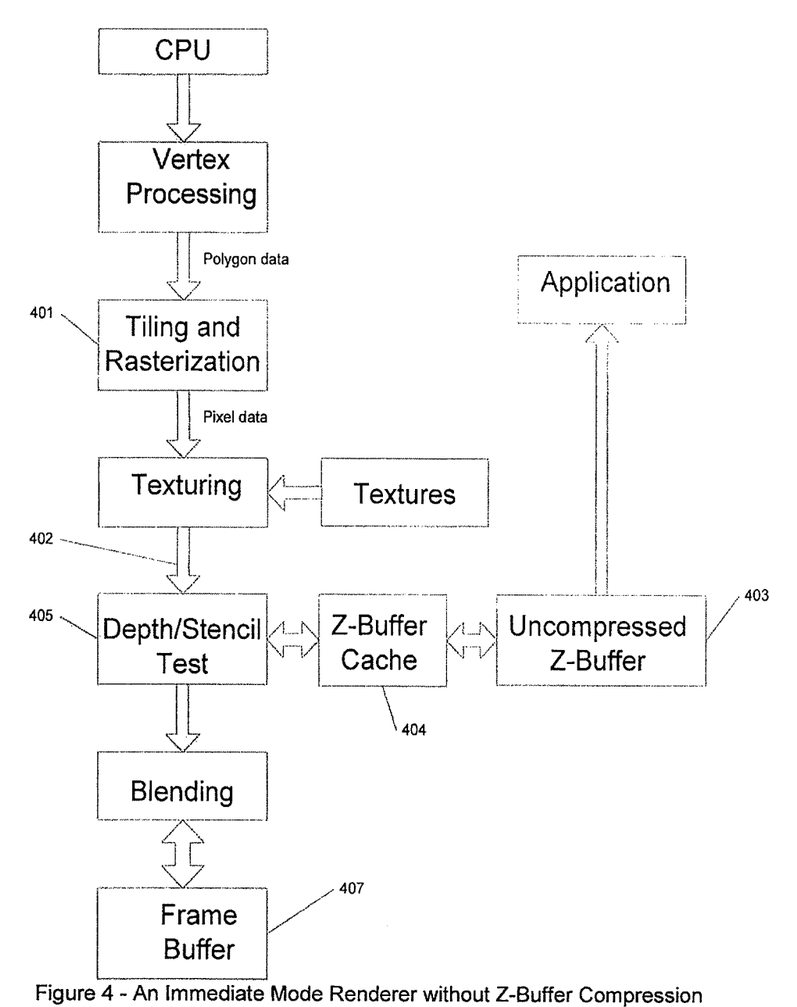
FIG. 4—shows a prior art immediate Mode Renderer without Z-Buffer Compression.
Figure 5:
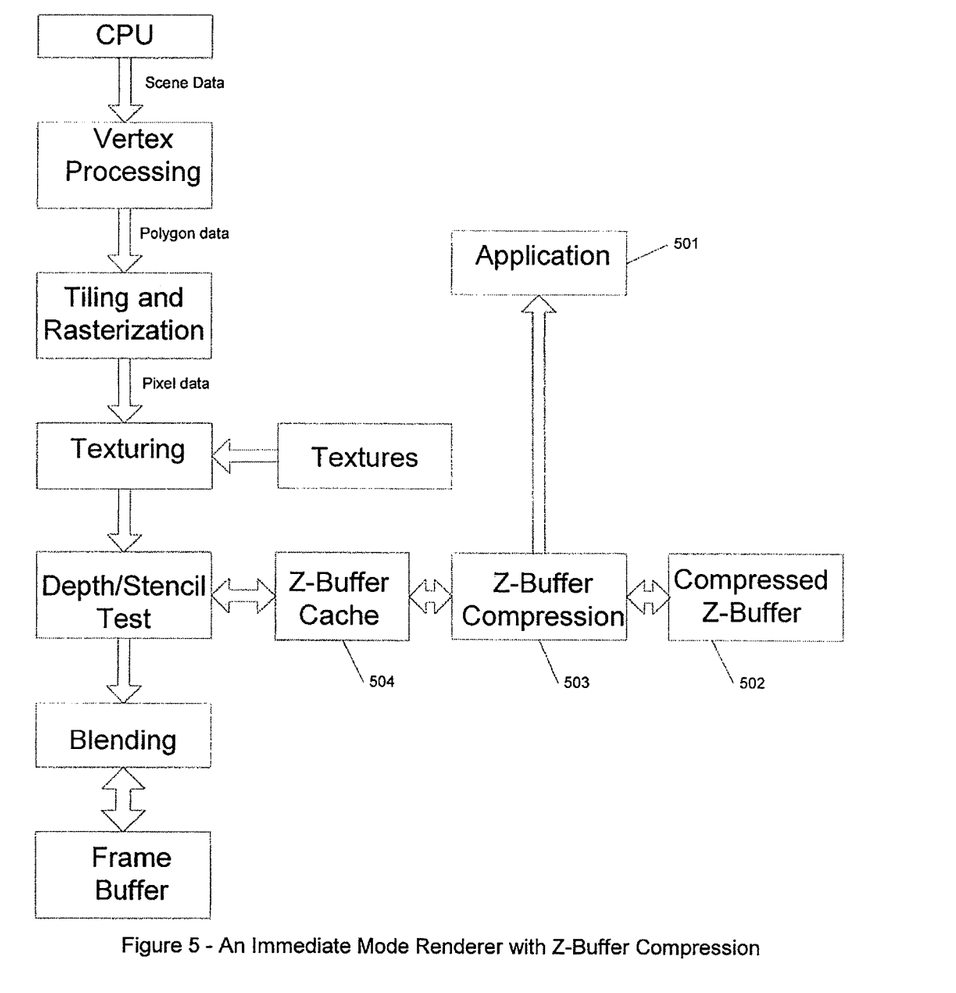
FIG. 5—shows an Immediate Mode Renderer with Z-Buffer Compression embodying the invention. This is identical to FIG. 4 except for a Z-Buffer Compression module 503 interposed between the Z-Buffer Cache 504 and the Compressed Z-Buffer in memory 502. In addition to reducing the quantity of data read from and written to memory, it enables applications 501 to access the Z-Buffer contents as if they are uncompressed.

Depth buffers can be divided 401 into rectangular tiles by a tiling and rasterisation unit, for example 8 pixels by 8 pixels, the contents of each tile being stored contiguously in memory. If the closest and furthest depth values of previously rendered fragments for each tile are also stored, then for any new polygon, it is possible to check whether or not the points on the polygon overlapping the tile are hidden behind those already written to the tile in the depth buffer, and accordingly to choose not to render the polygon or to update the depth buffer and the stored closest and furthest depth values for the tile. When updating a depth buffer, testing for a hidden polygon can be performed efficiently because the polygon lies on a single plane, and only the corners of the tile (if they lie entirely within the polygon), the vertices of the polygon (if it lies entirely within the tile) or the points at which the polygon crosses the tile's edges need be checked to determine which is closest and which is furthest. If the points on the polygon overlapping the tile are all in front of what has already been written, closest and furthest depth values should both be updated. If some are in front, only the closest depth value is updated. If all are behind, the polygon is not written at all. Similar approaches are described in U.S. Pat. No. 6,037,946 (Takeda) and GB2378108 (Morphet).

Depth Buffer Caching

A depth buffer cache is shown in FIG. 4 at 404. A cache is an amount of storage space, small compared with main memory, but whose contents can be accessed much faster than they can from main memory. Its use reduces the frequency of main memory accesses when points close to each other in a buffer (here, the depth buffer) are accessed around the same time.

The cache is typically divided into lines, each of which is used to store the depth values of points close to each other. If tiling is used, each line might store all the values of a single tile or a single row or column of values of a tile. When a new tile whose contents are not currently in the cache are accessed, they are read into a cache line which is either unused, or more normally contains valid data which, if it has been modified, will first have to be evicted, i.e. written to Z buffer memory before the new tile is read from memory. The cache line selected might be one containing the least recently used data. The only other time the contents of a cache line are evicted is when the cache is flushed. This happens when the corresponding buffer is no longer being written to. Variations on the basic cache design are numerous and are well known.

If a tile's contents are stored in the cache, instead of reading them from memory or writing to them there, the cache line containing them is read or written instead. The underlying depth buffer in memory remains unaltered at this point, and is only accessed when a cache line is initialized or evicted.

One result of using a cache is that it decouples modification of pixel data from writing to memory, as writing to memory occurs during cache line evictions, which can occur as a result of a pixel read involving data absent from the cache triggering the eviction of the contents of another cache line whose data was least recently accessed. Similarly, reads from memory can occur as a result of modifying pixel data if the data is not currently present in the cache.

SUMMARY OF THE INVENTION

Preferred embodiments of the present invention provide a method and apparatus for compressing a tiled depth buffer, by means of finding the planes containing the tile's corners. The pixels contained in each plane are found by determining the plane's equation from the corner pixel of a tile and the two adjacent pixels in the tile, and then checking whether pixel depth values at other points in the tile agree with the values predicted by the equation of the plane. This can be done serially, spreading out from each corner in turn, or in parallel, for all corners at once and for each point in the plane at once. Slight differences between actual and predicted depth values are acceptable as these can be stored in only a few bits. Pixels absent from all the planes found are stored uncompressed.

In accordance with a preferred embodiment of the invention there is provided a method for compressing depth data in 3 dimensional computer graphics system comprising the steps of:
a. dividing the depth data into a plurality of rectangular tiles corresponding to rectangular areas of an associated image;
b. for each tile to be compressed, identifying a number of starting point locations in the tile;
c. for each starting point location, determining a difference in depth value between a depth value at the starting point location and depth values at each of at least two further locations;
d. predicting a depth value at a plurality of other locations in the tiles from the thus determined difference values, and where a predicted value substantially matches an actual depth value for that location, assigning that location to a plane associated with the respective starting point location;
e. identifying the locations within the tunnel that are not assigned to a plane;
f. storing starting point location and depth value data, difference value data, plane assignment data for each tile, and storing locations in the tile not assigned to a plane with associated depth values.

In accordance with the invention there is also provided apparatus for compressing depth data in 3 dimensional computer graphics system comprising:
a. a means to divide the depth data into one or more rectangular tiles corresponding to rectangular areas or an associated image;
b. means for identifying a number of starting point locations for each tile to be compressed;
c. means for determining a difference in depth values between a depth value at a starting point location and depth values at at least two other locations in a tile for each starting point in a tile;
d. means for predicting a depth value at a plurality of other locations in the tile from the thus determined difference values;
e. means for determining whether a predicted depth value substantially matches an actual depth value for each location, and where there is a substantial match assigning that location to a plane associated with a respective starting point location;
f. means for identifying locations in a tile that are not assigned to a plane;
g. means for storing the starting point location and depth data, difference value data and plane assignment data for each tile, and depth values for locations not assigned to a plane for each tile.

These and further preferred features of the invention are defined in the appended claims to which reference should now be made.

BRIEF DESCRIPTION OF THE DRAWINGS

Embodiments of the invention will now be described in detail, by way of example, with reference to the drawings in which.

DETAILED DESCRIPTION OF THE INVENTION

One way to reduce the quantity of memory data transferred in each read or write operation to and from a memory, without at the same time increasing data transfer frequency is by holding the data in memory in a compressed format, which is decompressed when read, either into a cache line or used directly. When writing data, either from a cache to memory or directly to memory, the reverse process of compression takes place. Embodiments of the invention use such an approach and are described below.

Depth buffers are rectangular arrays built up from the depth values from several overlapping polygonal planes. Each location in the array corresponds to a pixel position on the screen and contains a value representing the depth of a polygon fragment currently closest to the viewer at that position. In some depth buffers, each location also contains a stencil value. The embodiments described here only discuss the depth component of this buffer, though it can be extended straightforwardly to include the compression of stencil values. For example, each location in a depth buffer might store a 32 bit word, 24 bits being used to store the depth and the remaining 8 bits either holding a stencil value or being set to zero.

In an embodiment of the invention each polygonal plane which has its screen depth stored within a depth buffer can, in principle, be compressed down to a set of data comprising the x coordinate, y coordinate and depth of a single vertex, the per-pixel x and y changes in depth across the plane (incremental depth changes), and the x and y coordinates of the remaining vertices. In practice, depth buffers are often divided into square (or more generally rectangular) tiles, e.g. of eight by eight pixels, and compression is performed on the depth buffer for each tile separately. This is done by taking in turn each corner pixel of the tile as a new plane's initial value (cornerVal) for that tile and, unless testing corner has already been found to be on a previously calculated plane, obtaining the incremental changes in depth for a single pixel step in the x and y directions (changeX and changeY), and next recording, for each row within the tile, how many pixels in the x direction the plane extends into the tile (the extent). Thus there is an initial depth value, an incremental depth value for each of the X and Y directions, and data defining the extent of a plane over the tile.

The depth of a plane at coordinates (i,j) within the tile is therefore predicted by the equation:

$$depth(i,j)=\text{cornerVal}+i*\text{changeX}+j*\text{changeY} \quad \text{(Equation 1)}$$

Because changeX and changeY are calculated from values which may be integer approximations to the exact depths at the corners and the two adjacent points, the depths further than one pixel from tile corners might not always be exactly represented by this equation, but will often have a small additional error, which can be stored along with its coordinates relative to the tile's top left-hand corner. If the error lies within a predetermined range, the pixel is still considered to belong to the plane. However, when a value outside this range is encountered, the pixel is then considered not to belong to the plane, and the search for pixels in the same plane continues on the following row.

It is worth noting the special case where changeX and changeY are both zero, and all the depths are identical. In that case, it is only necessary to store the corner value and the extent of the plane.

This means that, in general, a plane within a tile can be stored as (1) flag: A flag indicating whether the plane is completely flat (1 bit)

(2) cornerId: Which of the four corner pixels the plane starts at. This can be stored in two bits. (A starting corner is show as 100 in FIG. 1).

Figure 1:
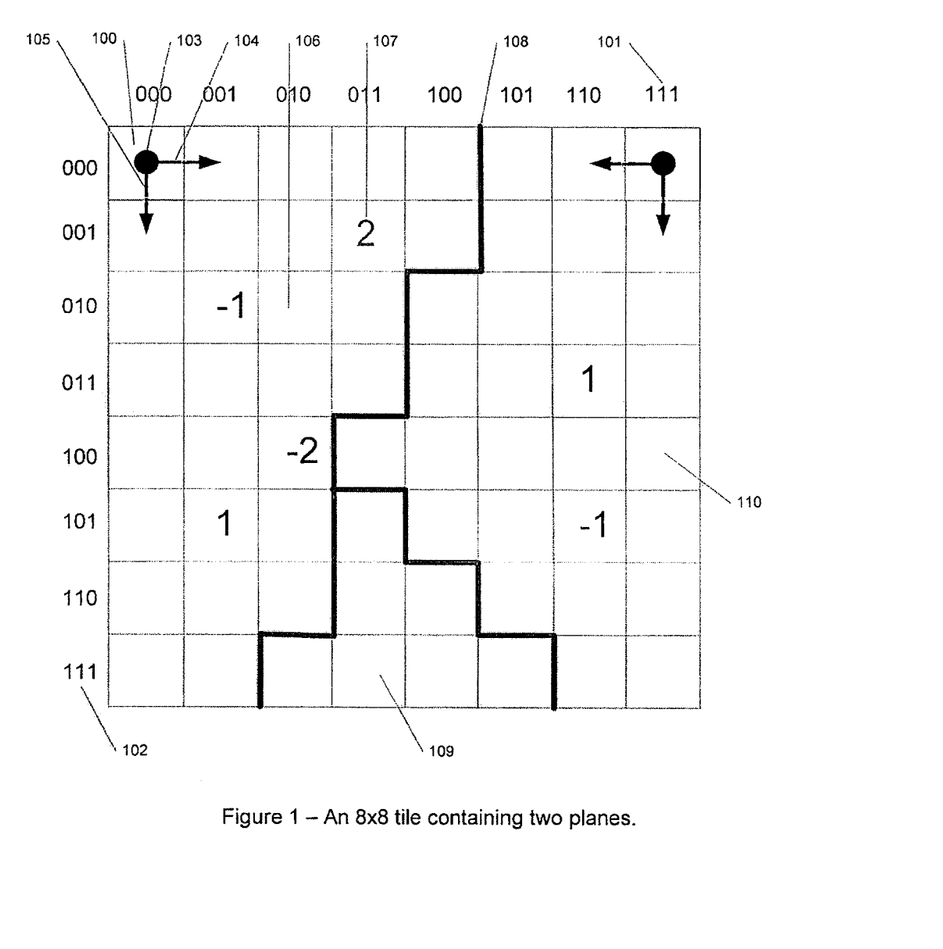
FIG. 1—shows an 8×8 tile containing three planes, two of which may be easily compressed using an embodiment of the invention.

(3) cornerVal: The depth value 103 for the pixel at the corner. In typical implementations, this is at least 24 bits.

(4) changeX: The incremental change in depth in the x direction 104, typically calculated by subtracting the depth value for the pixel in the tile immediately to the left or right of the corner from the corner pixel depth value. Note that, although in the worst case the value of changeX can range from the maximum depth value to its negative, and this would require one more bit to store than an uncompressed depth value, in that case the plane could not be extended further into the tile and would therefore not be compressed. More typically, by taking into account the relative rarity of very steeply inclined planes, it would be possible to store changeX in significantly fewer bits than are required for cornerVal, by taking into account the relative rarity of very steeply sloping planes. Once a reduced size is chosen for changeX, most values could be stored within it, and a flag could be used to indicate any exceptions.

(5) changeY: The incremental change in depth in the y direction 105 calculated by subtracting the depth value for the pixel in the tile immediately above or below the corner from the corner pixel depth value. This can be stored as in the same way as changeX.

Figure 2:
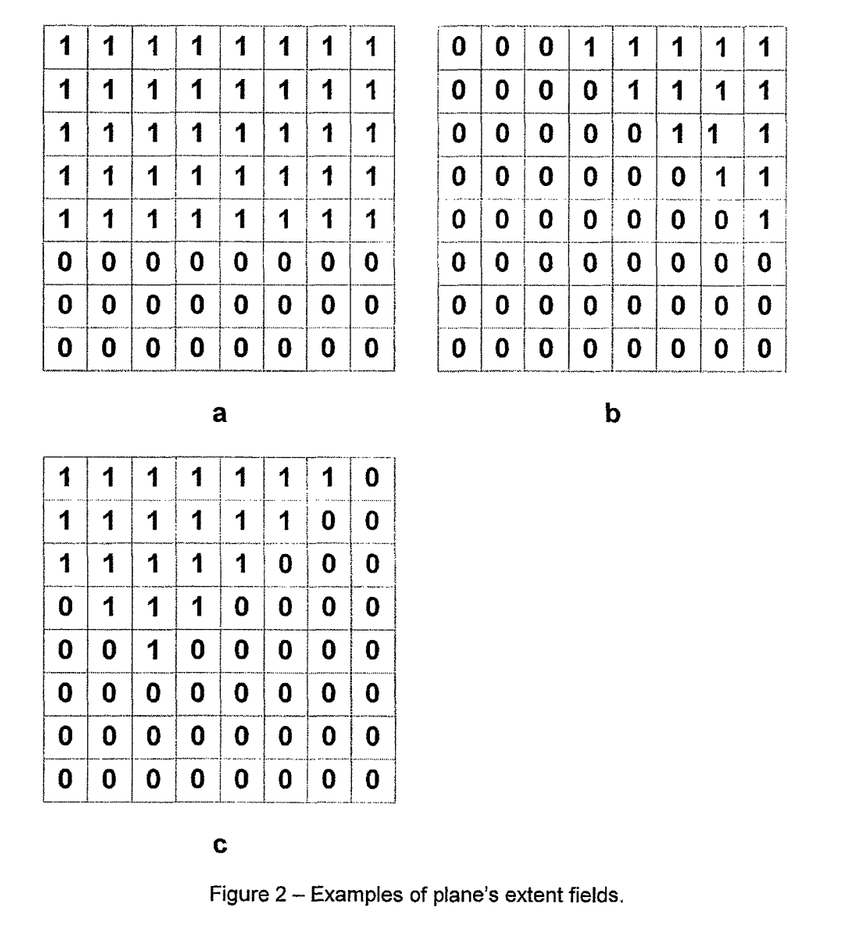
FIG. 2—shows examples of plane's extent fields within a tile.

(6) extent: An indication of which pixels within the tile belong to the plane. For example, the plane, 106, beginning at the top-left corner of the tile in FIG. 1 is bounded on the right hand edge by the line 108. For an 8 pixel by 8 pixel tile, the extent field could be implemented as a 64 element bit-map, with each set bit indicating a pixel contained within the plane. Examples of possible extent fields are shown in FIG. 2. Where no further optimisation is possible, the bit map may simply be stored as eight bytes. However, in most cases, it is possible to store the extent field more efficiently. One possible mode of compression is to recognize when the plane occupies the entirety of several rows in the tile starting at the plane's corner pixel (e.g. as in FIG. 2a). In the case of an eight pixel high tile, it is possible to indicate this by storing the number of rows in 3 bits. Another mode of compression, which is appropriate for storing the extent fields of many planes for which the first method is unsuitable (such as that shown in FIG. 2b), is to store the number of rows comprising the plane, followed by the number of pixels (which are assumed to be contiguous) within the row belonging to the plane, starting from the side containing the corner. For the eight by eight pixel tiles this mode uses 3 bits for the number of rows, and 3 bits for each row containing pixels belonging to the plane, resulting in storage of up to 27 bits. There also have to be two more single bit flags, one indicating whether extent is compressed, and another indicating which of the two proposed methods has been used for the plane.

For example, the extent field illustrated in FIG. 2a could be compressed as 1 (extent is compressed) 1 (extent is only whole rows) 101 (number of rows of extent), that of FIG. 2b could be compressed as 1 (extent is compressed) 0 (extent contains partial rows) 101 (number of rows of extent) 101 100 011 010 001 (last column in each row, counting from the plane's corner), and that of FIG. 2c cannot be compressed (because the fourth and fifth rows do not start at the tile's edge) and is represented as 0 (extent is not compressed), followed by the bitmap values, 11111110 11111100 11111000 01110000 00100000 00000000 00000000 00000000.

(7) sparseVals: a list of the positions and values of depth errors, used when the depth predicted by Equation1 does not match the actual depth at that position, but where the difference is sufficiently small that a pixel can still be considered to be part of the plane. (E.g. the pixel at 107 in FIG. 1.) For example, within an 8 pixel by 8 pixel tile, the x and y coordinates (101 and 102 respectively in FIG. 1) each range from 0 to 7 inclusive, and so can each be stored in three bits. The sparse value itself can then be stored in a small number of bits, for example 2 bits, permitting the storage of error values of −2, −1, 1 and 2. Memory allocated for sparseValues must allow for one value for each pixel in the tile, other than the three pixels at and adjacent to each corner. However, during serialization, only the values found, rather than the whole memory allocated, need be copied. A further six bits are required to store the sparse value count. Other, but similar arrangements are possible for tiles of other sizes, e.g. a 4×4 tile could use two bits for each coordinate with error values ranging from −8 to +8 to form an eight bit value, and a 16×16 tile could use four bits for each coordinate with error values ranging from −64 to +64 to form a 15 bit sparse value.

For example, the plane 106 in FIG. 1 has sparse values encoded as 000100 (number of sparse values); 001 (y coordinate); 011 (x coordinate); 01 (encoding for a depth error of 2), followed by similar encoding for a further three depth errors: 01000111 10001010 10100100. Similarly, the plane 110 has two sparse values encoded as 000010 01111000 10111011.

Using the system and method described above up to four different compressed planes can be found in turn within a tile, each starting from one of its corners. To facilitate the process of allocating pixels to compressed planes (e.g. so that the pixels that were not assigned to any plane can be located straightforwardly it may be expedient to record which of the pixels have been assigned to any plane, in a separate field (hereinafter referred to as coverageMap) which is the union of the four extent fields.

It is possible that a tile might be uncompressible, i.e. it has no planes found for which the compression method yields a net reduction in memory used. Three bits are required to store the number of planes 0-4. This leaves additional values 5-7 for other purposes, e.g. to indicate that the tile contains a single flat plane, i.e. with all depth values equal, in which case only one depth value needs to be stored, or to store further planes not extending to the corners (e.g. with starting pixels at the middle of the tile). Otherwise, the planes, serialized as described above, follow the number of planes.

There may be depth values left over after compression which were not found to belong to any plane, such as the region 109 in FIG. 1, and these may be stored uncompressed.

In the worst case, in which no planes can be found, all the depth values are stored uncompressed. Even in this case, there may be a significant improvement from the repacking of the data, or from the omission of stencil values. If one or more planes are found, a 1 bit flag can be stored after the compressed planes to indicate whether any uncompressed depth values follow. Note that even when one or more planes are found, storing the locations of uncompressed depth values is unnecessary, as they can be deduced from coverageMap field, provided they are stored according to a fixed convention, e.g. from left to right and then top to bottom.

For an 8 pixel by 8 pixel tile array, and 8 bit sparse values, the process of allocating pixels to compressed planes in an embodiment of the invention may proceed sequentially (serially) as follows (see FIG. 9):

It should be noted that there is a distinction between proceeding serially or sequentially and the serialisation process. Serialisation is the process by which the compressed data are converted to a stream of data for writing to memory. Both the serial and parallel compression embodiments described below include a serialisation step to convert compressed data to a stream for writing to memory.

In a serial embodiment (and, indeed, in other embodiments), the depth buffer is a 2-dimensional array of depth values that result from the rendering of a set of polygons. At the time of compression of the depth buffer the data about the polygons themselves are no longer available. Embodiments of the invention compress the data by attempting to fit a small number of planes to the data in each tile in the depth buffer without reference to the original polygons. Usually the data in a tile do represent the depths of a small number of polygons.

A plane is associated with a corner by taking the depth value of that corner and the incremental X and Y values within the tile at that corner. These are then used to define the plane. Provided these three pixels were all originally rendered as part of the same polygon then the plane on which the three depth values will lie will reflect the actual orientation of the original polygon. If that polygon extends further across the tile then the values determined at the corner will continue to predict the depths for the depth buffer pixel locations corresponding to the extent of the polygon.

It is of course possible that the depth value used to calculate e.g. the incremental X values are depths from two different polygons. If that is the case then the plane found from the three pixels will not reflect the plane of either polygon and compression will be poor. This situation is relatively uncommon.

Association between pixels and planes can be made by testing further pixels to see if the depth value fits the model of the plane. In the serial embodiment described below testing proceeds along a line of a tile (horizontal or vertical) until a pixel is found which does not lie on the same plane as the previously determined pixels. At that point, the next adjacent line is processed in the same manner. As a result, the extent of a plane gradually grows from the starting corner point. This process is described in more detail below with reference to FIG. 9.

Figure 9:
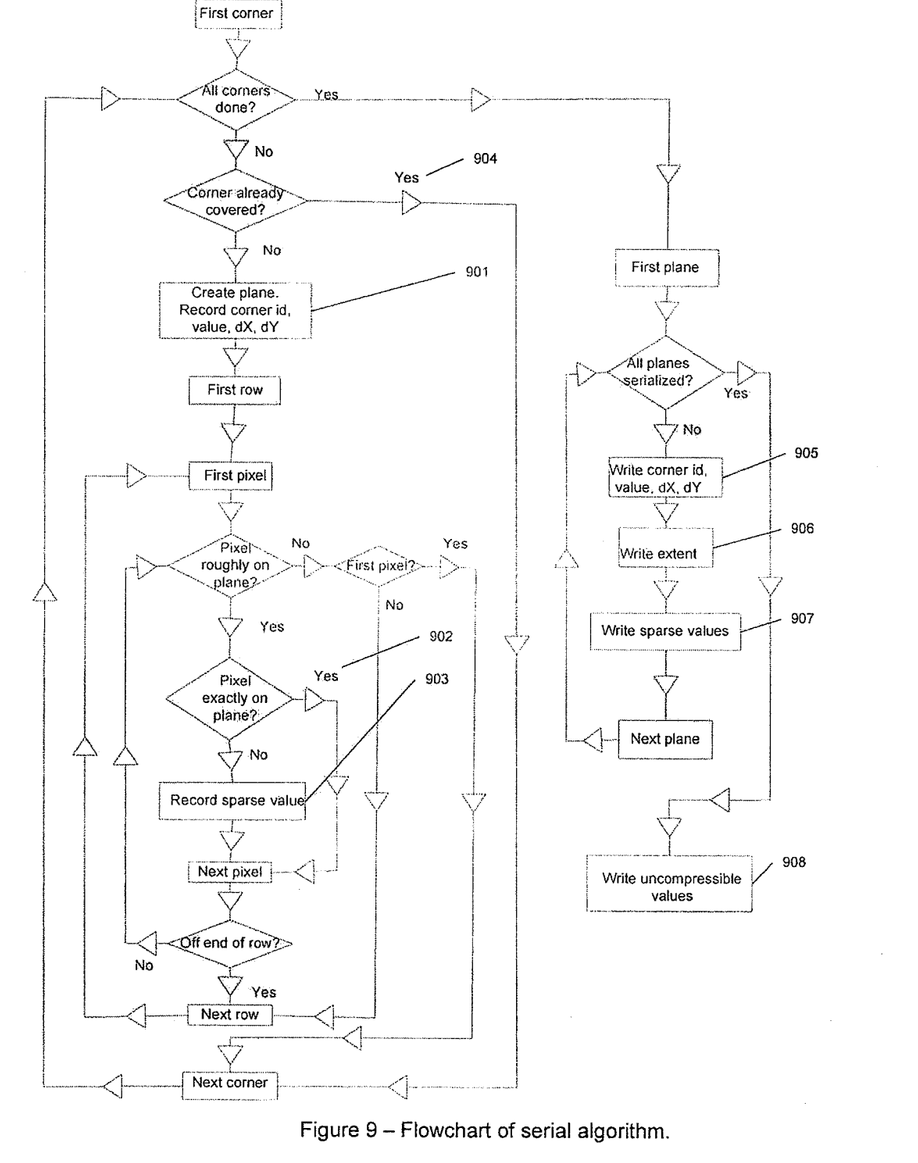
FIG. 9—shows a flowchart of an embodiment of a serial algorithm for compression of the depth buffer data.

Each corner pixel is chosen in turn, and its depth value (cornerVal) is recorded. Then, this is subtracted from the depth values of each of the two pixels at one pixel's distance horizontally and vertically to form changeX and changeY 901. Then the tile is scanned horizontally with changeX and changeY being used to incrementally change the predicted depth value and a comparison being made with the actual depth value at each pixel. If the pixel's depth value is exactly as predicted by Equation 1, there is no need to store a sparse (error) value 902. Otherwise, provided firstly that the pixel under consideration is not already marked as allocated to a compressed plane in coverageMap, and secondly differs, but by no more than 2 from the depth value predicted by Equation 1, it is written to sparseVals and the sparse value count is updated 903. In these cases, the corresponding bit in the plane's extent field is set. If the corresponding bit in coverageMap has already been set from the processing of another plane, or the difference exceeds 2, the pixel, and subsequent pixels on the same horizontal line, are excluded from the plane, and the allocation of pixels to the plane continues on the following line.

Processing from a corner pixel is skipped if its bit in coverageMap is set, as it already belongs to a previously compressed plane which was compressed with reference to another corner.

Each plane found is then serialized, by writing out its cornerId, cornerVal, changeX, changeY 905, extent 906 and sparseValues 907 fields. This is done for the corners of the tile in a predetermined order. This is followed by the uncompressed values 908.

Any pixels whose corresponding bits in coverageMap are not set correspond to values which could not be compressed, as they are not assigned to any plane under consideration, and these have to be stored uncompressed, once all the planes have been processed. Alternatively, in an extension of the scheme described above, the procedure described for assigning pixels to a compressed plane could also be applied to any remaining contiguous pixels, given an appropriate starting point other than at one of the corners of the tile.

In order to deal with the assignment of planes to pixels which are not assigned to planes which start from one of the corner pixels, further processing is required. In principle, three points which form a triangle (i.e. are not on a straight line) are required. From these the plane's equation can be derived and thus cornerVal, changeX and changeY, and cornerId. The names cornerVal and cornerId are used here even though these are not in fact planes starting from corners of the tile, but they still share the same purpose of identifying the depth of the plane at a starting point and the directions in which the changeX and changeY values were determined. In addition, the coordinates of the starting position have to be recorded.

In a serial embodiment, one way to detect pixels which are unassigned and therefore possibly on a different plane, is to start from the four centre pixels and work outwards, in a spiral for the purely serial case. Another method would be to provide a coverage map for the tile showing where planes have been assigned to pixels and then to commence in that coverage map using e.g. the left most pixel on the highest row unassigned as a first starting point.

For a parallel implementation, when starting from the centre, it may be more convenient to consider four quadrants in the tile and start from the centre pixel in a quadrant and work outwards. This is because pixels in the centre of a tile are the ones most likely to be left over after planes containing the corners have been found.

Other strategies to define starting points for planes which do not cover the corners of tiles are possible. Any plane found is stored in a similar manner to the corner planes.

The process of allocating pixels to compressed planes for pixels in planes, starting from each tile corner, has been described above as being performed for each corner pixel in turn. Alternatively, it can proceed in parallel for each corner, as follows:

The parallel process is similar to the serial process in that the parameters of each plane are determined by three depth values and the corner of a tile (or other starting point). Parallel processing has a complication in that there is a precedence system required since it is possible that two or more corners may be covered by a single polygon. For example, in a case where all the corners are covered by a single large polygon, when processing in parallel four planes will grow towards the centre of the tile and meet somewhere near the middle. This will then be stored as four similar planes when it would have been more efficient to represent them as one. The use of the precedence system allows a plane to take pixels already allocated to a lower precedent plane which also lie on the higher precedent plane. For example, if four planes starting from each corner are processed simultaneously and grow towards the centre of a tile then once there is contention between the extending planes the three of them will shrink back as the higher precedence plane determines that the pixels claimed by two or more corners are on the same plane as that of the highest precedence corner and will claim these back. This will work just as well when two or three corners are on the same plane.

Preferably, in a fully parallel embodiment not only do four corner processes operate in parallel, but each pixel in the tile is tested in parallel. In such an embodiment, any of the four planes could make a simultaneous claim for any pixel in the tile. A precedence system is utilised to ensure that each pixel is allocated to the highest priority plane claiming it.

The elements of coverageMap, in this case, are extended so that each is able to be unset, or to indicate which corner pixel of the tile is contained in the same plane as another corner pixel. The process of allocating pixels to compressed planes proceeds as above, except that it proceeds from each of the four corners occur concurrently, with each corner assigned a different precedence (for example, −cornerId, if the top left corner (cornerId=0) is to be given highest precedence). Instead of stopping to resume on the next line when a pixel's bit in coverageMap is set, it does this only if the indicator in coverageMap has already been set by a process initiated from a corner with a higher precedence. If an indicator is unset or has already been set to a lower precedence, the pixel is assigned to the higher precedence plane, the bits in the corresponding extent fields are updated to reflect the new assignment of the pixel, and the indicator in coverageMap is updated with the precedence value of the plane.

When the parallel allocation processes have completed, if a plane has all the bits in its extent field unset, it is not included in the serialization of the compressed data.

Figure 3:
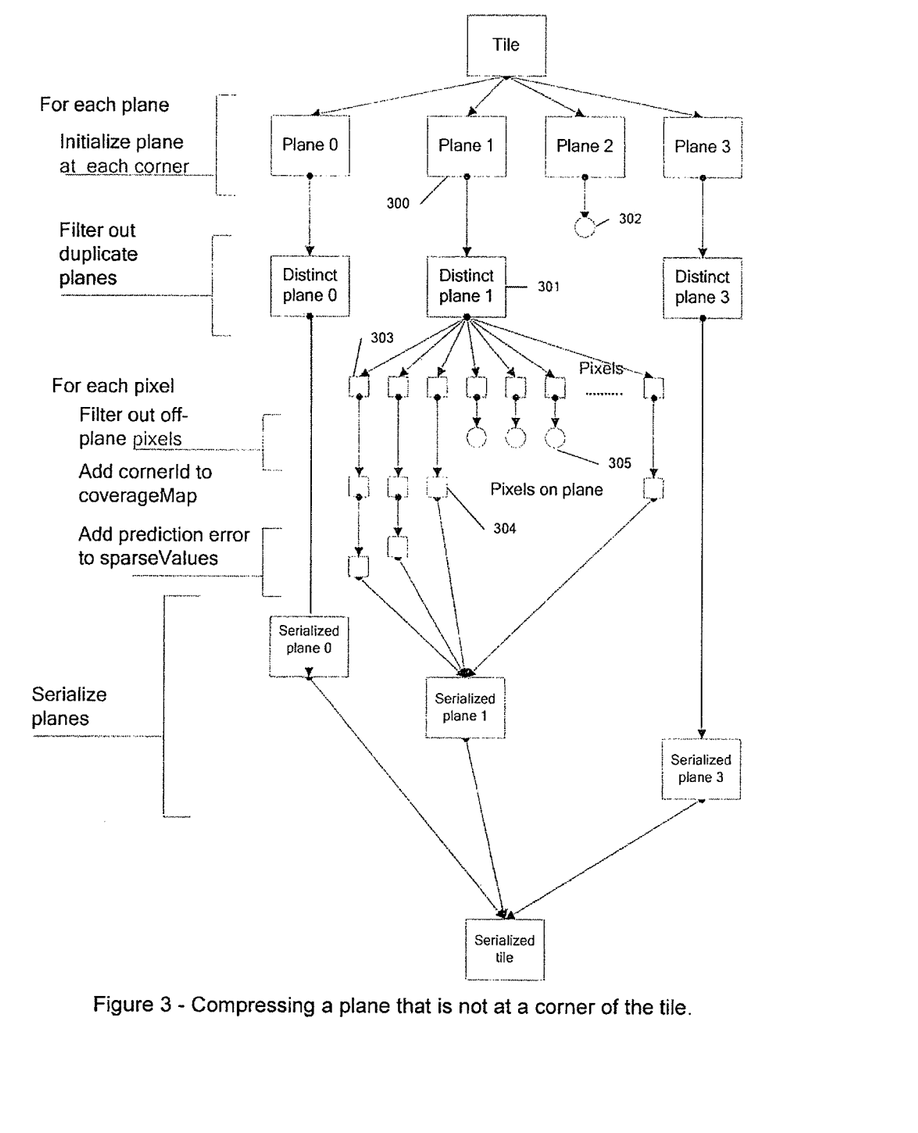
FIG. 3—shows schematically a parallel version of the depth compression algorithm embodying the invention.

Alternatively, parallelization can be done per pixel as well as per plane. This parallelization is illustrated in FIG. 3, and is performed as follows:

For each corner in parallel, the parameters cornerId, cornerVal, changeX and changeY are computed for the plane 300 associated with that corner.

Since planes often span more than one corner, for each distinct plane e.g. 301, only the one with the highest precedence (lowest cornerId) is kept. Any duplicate planes e.g. 302 are discarded. A plane is a duplicate if its corner is contained in another plane's extent field.

For each remaining distinct plane in parallel, each pixel in the tile e.g. 303 is processed in parallel. A pixel is on the plane 304 if the following condition holds: the corresponding indicator in coverageMap has not yet been set, or is less than cornerId (and therefore has higher precedence), and the pixel is either one of the three corner pixels (which are always guaranteed to belong to their own plane) or the prediction error (calculated by subtracting the result of Equation 1 from the pixel's depth value) is less than the maximum permissible error. Unless the pixel is off-plane 305, the corresponding indicator in coverageMap is set to cornerId, and, unless the predicted error is equal to 0, the predicted error and its coordinates are added to sparseValues. To avoid more than one per-pixel process writing to sparseVals at the same time, a mutual exclusion mechanism, such as a semaphore, would have to be used.

Alternatively, instead of processing each pixel in parallel, the rows can be processed sequentially, starting from the one containing the corner, and each pixel within this row can be processed in parallel exactly as in the previous variant of the method. After processing the first row, the values predicted by Equation 1 are based on the values computed from the previous row, by adding changeY to them. (The same result would obtain by substituting column for row, and changeX for changeY in the above.)

The data are then serialized.

In an alternative embodiment of the parallel implementation methods, it is unnecessary for each plane to have its own extent field until serialization, as it can be deduced from the values of the indicators in coverageMap. Pixels not found to be on any plane within the tile are unset in coverageMap.

In a further alternative embodiment of the invention, an attempt is made to compress planes that do not extend to the corners of a tile. Such an area is shown as region 109 in FIG. 1, and as 803 in FIG. 8. Compressing these areas is conceptually a straightforward extension of the method described above, but requires some modification.

Figure 8:
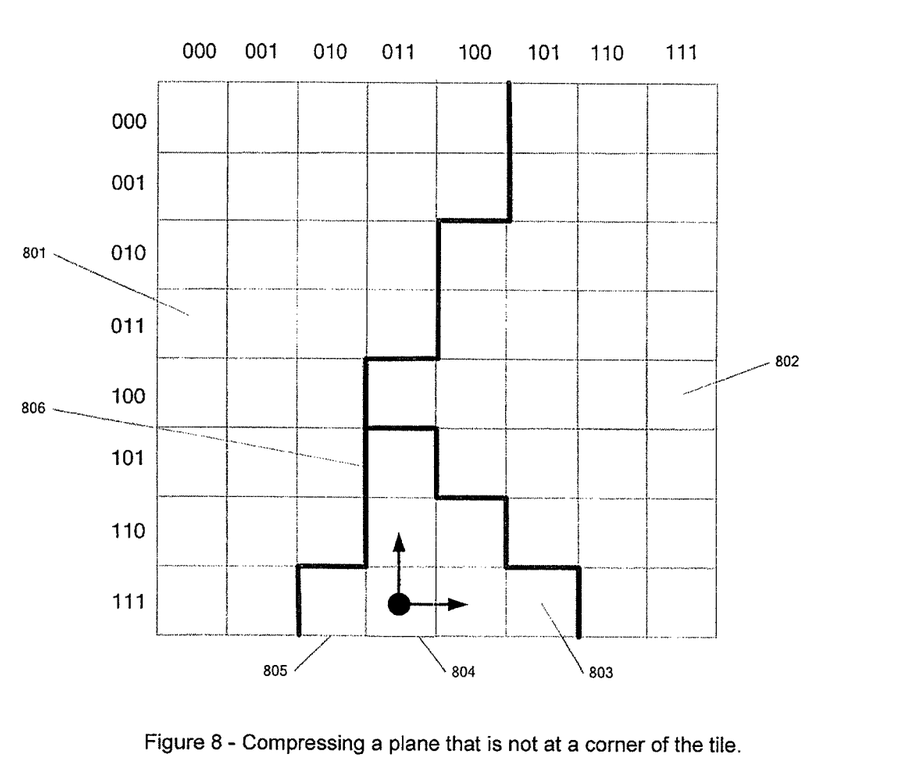
FIG. 8—Shows the same planes as FIG. 1, with consideration given to the compression of the third plane.

FIG. 8 shows the same arrangement of planes as FIG. 1. Regions 801 and 802 extend to the corners of the tile and will be compressed first. It is only after compression of these planes is complete that it can be determined that region 803 may still be compressed. Note that this has implications for the parallelization of the algorithm, as compression of region 803 must occur in a second pass. In theory, still further passes may be required to compress the whole tile, but practical tile sizes are such that there is unlikely to be any significant benefit beyond a second pass.

Since region 803 does not extend to a corner, a suitable starting point for the compression must be chosen. Locations 806 (topmost) or 805 (leftmost) are unsuitable, as horizontally and vertically adjacent locations do not all belong to the unassigned region and therefore are unlikely to accurately predict the depth values in the region. In this case, location 804 may be chosen. Serial horizontal and vertical scanning of the tile may then fail to allocate pixel 805 to the plane, although a parallel implementation should include it.

After multiple passes of compression, there may still be depth values not assigned to any plane, and these are stored uncompressed.

Encoding and serialization must be modified for this embodiment of the invention. In particular it is necessary to indicate that a plane does not start in a corner of the tile. The coordinates of the starting point may be encoded in the serialized data stream, or, the decoder may be able to infer the starting point using the same method as the encoder used to select it. These modifications are not discussed in the description of serialization below, but should be easily made by a person skilled in the art.

Decompression

Figure 10:
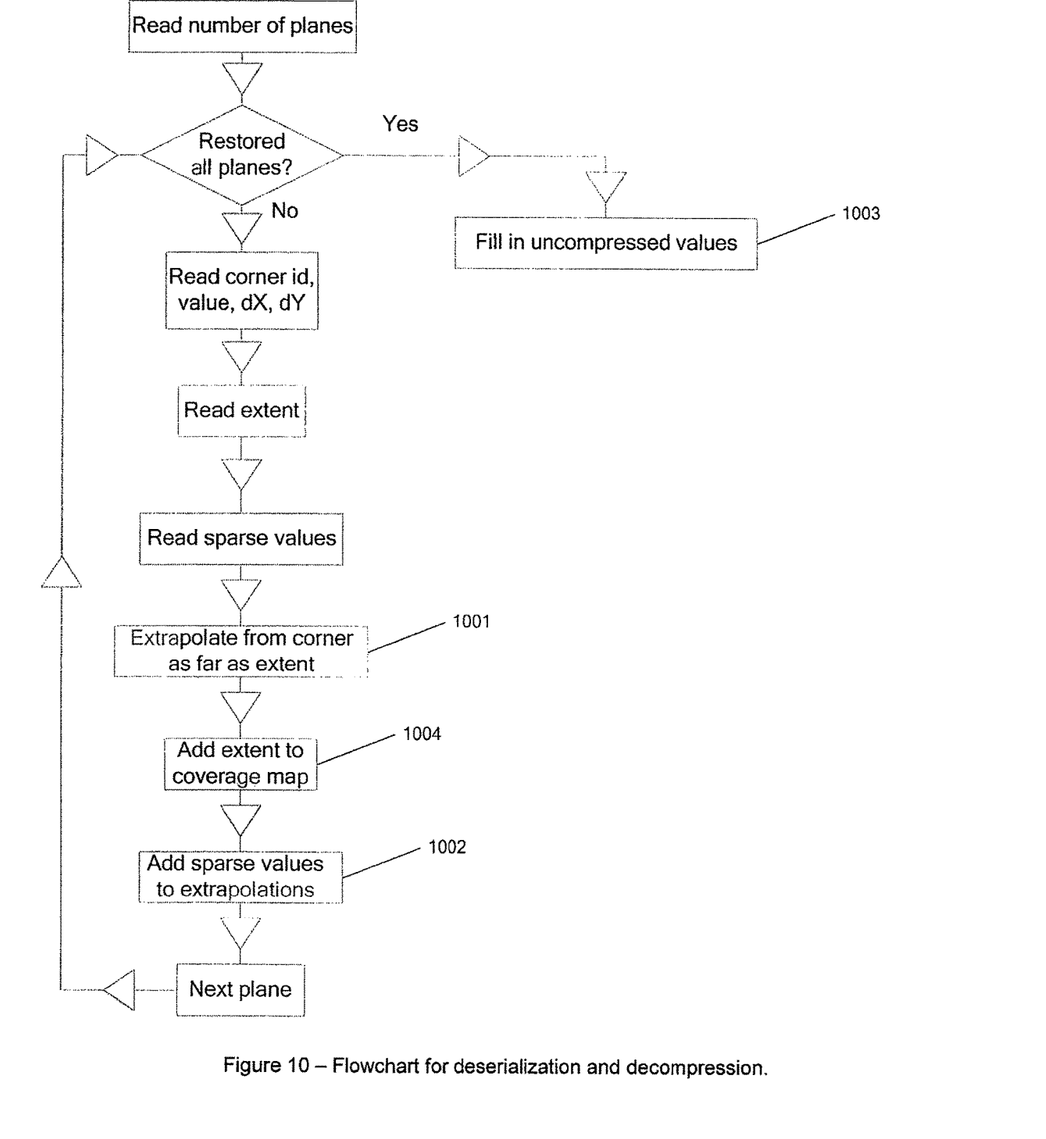
FIG. 10—shows a flowchart of an embodiment for deserialization and decompression of compressed depth buffer data.

This is the reverse process to compression, and is performed following deserialization. The process is shown in the flow diagram of FIG. 10. For each plane, the depth values for each pixel can be calculated using Equation 1 initially 1001, and then adjusted by adding the value contained in sparseVals 1002. The pixels not contained in any planes are then filled in from uncompressedValues 1003 using the coverage map, generated by combining each plane's extent field 1004, as a template.

Parallel decompression is similarly straightforward. Equation 1 is applied first for every pixel. sparseVals is then used to adjust the value obtained. Each value in sparseVals can be processed concurrently. While this is proceeding, uncompressedValues can be filled in.

Serialization

There is significant scope for variation in the details of serialization. One possible scheme for an 8 pixel by 8 pixel tile with a maximum of four planes, all starting at corners of the tile, and the space occupied, is described here. In what follows, BNF (Backus Naur Form) is used. '→' means 'contains'. (*N) following an item indicates N different sequential occurrences of the item, e.g. plane (*N) indicates N different occurrences of a plane. * following a item indicates a variable number of occurrences of the item.

The formats for a plane, once serialized, are in the case of a completely constant depth plane:

$$\text{plane} \to 1 \text{ corner cornerVal extent} \quad \text{(Equation 2)}$$

and otherwise:

$$\text{plane} \to 0 \text{ corner cornerVal changeX changeY extent sparseVals} \quad \text{(Equation 3)}$$

$$\text{sparseVals} \to N(j\ i\ \text{sparseValue})*N \quad \text{(Equation 4)}$$

The tile, comprising planes, and any remaining depth values can be serialized using the following format, but other formats are possible:

If every pixel belongs to one of the planes found, the format is $$\text{tile} \to N \text{ plane}(*N)0 \quad \text{(Equation 5)}$$

where N is the number of planes found 1, 2, 3 or 4.

If some pixels do not belong to any plane found, they have to be stored uncompressed, along with their positions, which correspond in the serial algorithm described above to the unset bits in the coverageMap bit array in the sequential algorithm, and to the unset indicators in the parallel algorithms:

$$\text{tile} \to N \text{ plane}(*N)1 \text{ uncompressedValue}* \quad \text{(Equation 6)}$$

If the tile cannot be compressed at all, its format is:

$$\text{tile} \to 000 \text{ values}(*64) \quad \text{(Equation 7)}$$

In the best case (and in general when the depth buffer is initialized), the tile has constant depth and all that needs to be stored is the fact that it is flat and its value:

$$\text{tile} \to 111 \text{ cornerVal} \quad \text{(Equation 8)}$$

More usually, up to four planes are included in the tile.

Depth buffer compression typically takes place in the context of a cache. When a line is evicted from the cache to memory, it is automatically compressed. Similarly, when a tile is read into a cache line, it is automatically decompressed.

In a typical case where a depth buffer uses 32 bits of storage per pixel location, but only contains a 24 bit depth value, the method described here invariably achieves a reduction in the size of the data. This is true even if a tile cannot be compressed at all and is written as a series of 24 bit values, simply due to the more efficient packing. However, this compression method is equally applicable to other depth buffer formats, and in general it cannot be assumed that the compressed data will always be smaller than the size of the depth buffer.

In a case where efficient compression cannot be achieved, there is an option to write the contents of a tile depth buffer to memory uncompressed. This option would be selected if, during an attempt to compress a tile, the size of the compressed data exceeds the size of the raw data in the depth buffer. A single bit must be stored per tile to indicate whether the data in memory contains compressed data or raw depth buffer contents. In this way the maximum expansion of the depth buffer in memory is limited to one additional bit per tile. In order to fit the data within the footprint of the raw depth buffer, this additional bit must be stored in a separate data structure. This structure may also be cached. If there are unused bits in each pixel, all the data can be stored contiguously using the formats of equation 5 (with N=0) or equation 6.

Deserialization

This is the reverse the serialization process outlined above.

Treatment of Stencil Values

If these are present along with depth values, they can be serialized at the end of the serialized depth values, using a well known method such as run length encoding.

Use within a Tile-Based Renderer

Figure 6:
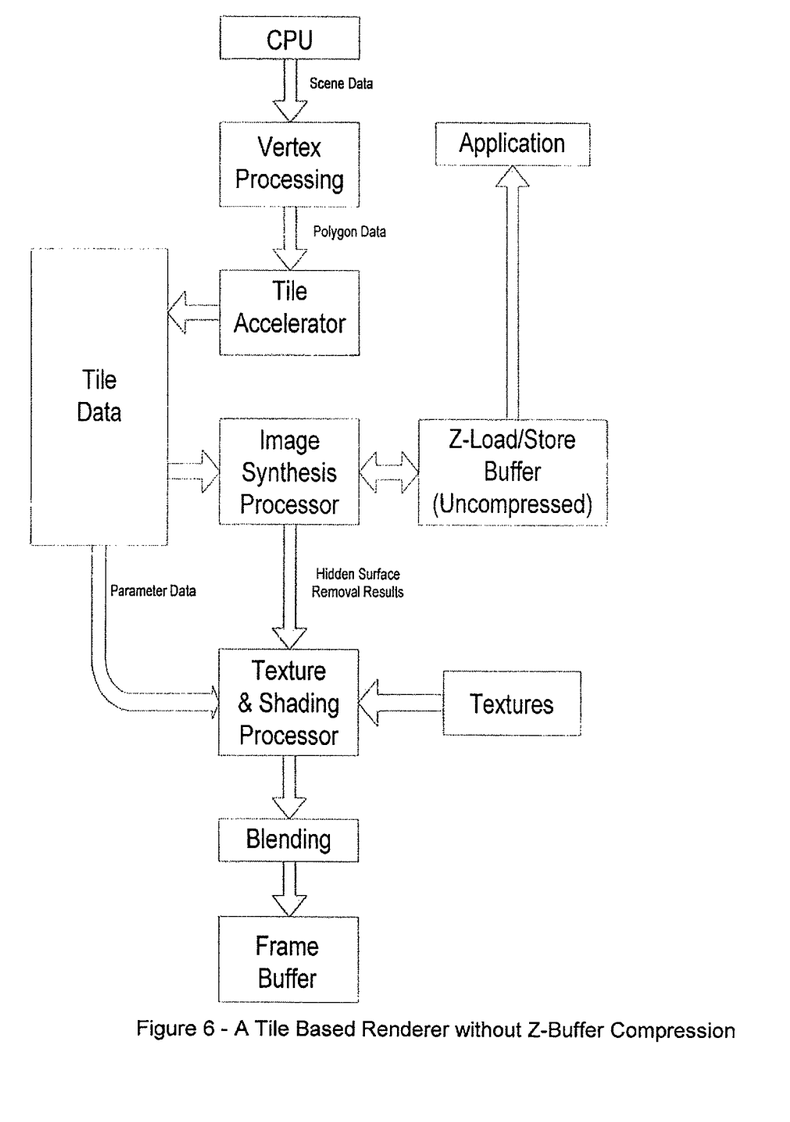
FIG. 6—shows a block diagram of an example architecture as an example of a tile-based deferred renderer without Z-Buffer Compression.
Figure 7:
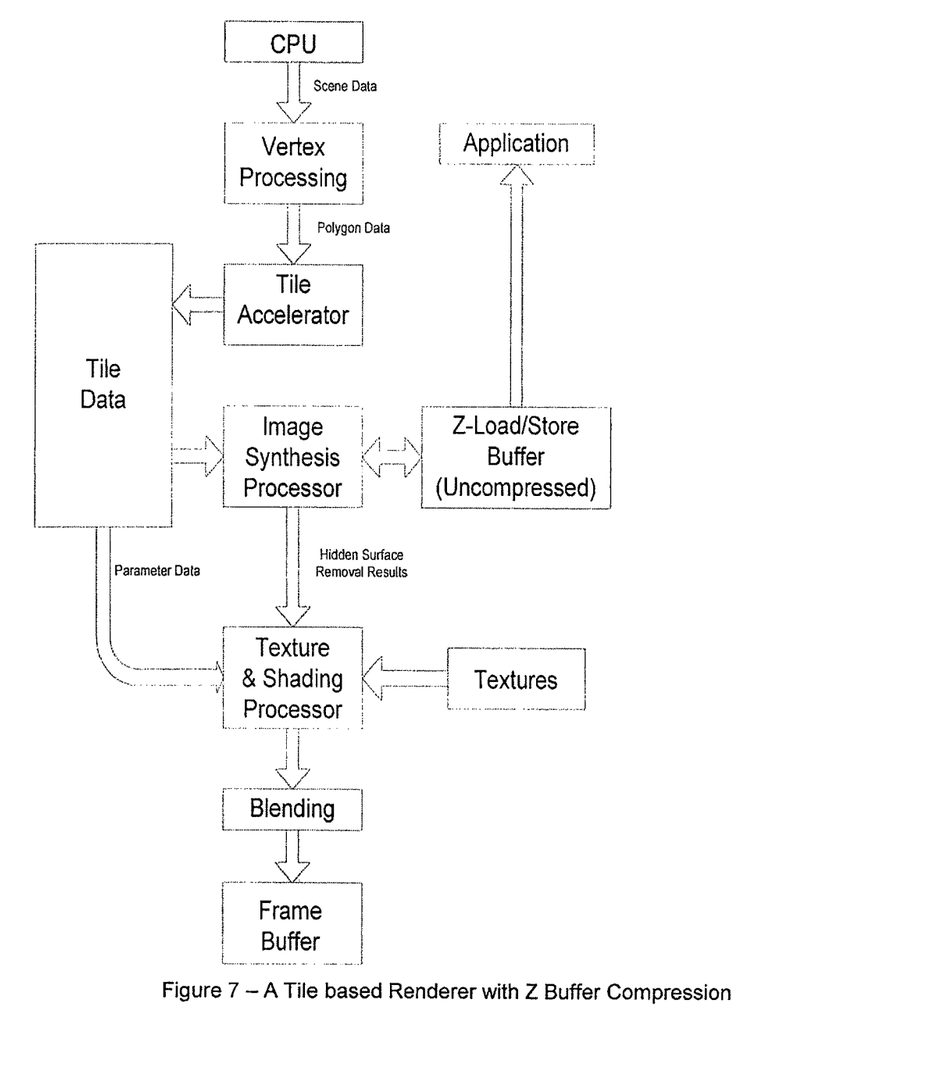
FIG. 7—shows the tile-based renderer of FIG. 7 with Z-Buffer Compression.

In tile-based renderers, such as those illustrated in FIG. 6 and FIG. 7, depth testing occurs in the Image Synthesis Processor (ISP) 704, so an external depth buffer is not required for deciding which polygon should be displayed at a given pixel. However, it is sometimes desirable to save the internal state of the ISP, for example after performing a partial render as a result of the Tile Data memory becoming full. This process is known as Z Load/Store and is described in our European Patent application no. EP1287494 (Morphet). In other cases, an application may require access to a depth buffer after rendering is complete. In cases such as these, depth buffer compression is still desirable and could be carried out as above. The Z-Buffer Compression module 703 would then be interposed between the image synthesis processor 704 and the compressed Z-Load/Store buffer 702, and would also provide the depth values of each pixel to the application 701.

I claim:

1. A method for compressing depth buffer data in a 3-dimensional computer graphics system, wherein the depth buffer data is divided into a plurality of rectangular tiles corresponding to rectangular areas of an associated image, comprising:

for each tile to be compressed, identifying a plurality of starting point pixels in the tile;

for each starting point pixel of the plurality of starting point pixels:

determining a difference in depth between a depth value at the starting point pixel and respective depth values at each of at least two further pixels to determine changes in depth for x and y directions of the tile, and predicting a depth value at a plurality of other pixels in the tile from the determined changes in depth for the x and y directions of the tile, and where a predicted depth value for a pixel substantially matches an actual depth value for that pixel, assigning that pixel to a geometrical plane associated with the starting point pixel;

identifying pixels within a tile that are not assigned to any geometrical plane associated with the plurality of starting point pixels;

for each tile, storing:

for each geometrical plane, starting point pixel and depth value data at the starting point pixel, depth change data, and plane assignment data, the plane assignment data indicating which pixels in the tile are assigned to that geometrical plane, and data indicating which pixels in the tile are not assigned to any of the geometrical planes and depth values for those pixels.

2. A method according to claim 1 in which differences between predicted depth values and actual depth values which are below a threshold are considered to be substantial matches.

3. A method according to claim 2 in which the differences between depth values which are below a threshold are stored as a sparse matrix.

4. A method according to claim 1 wherein each of at least two further pixels for each starting point are determined by selecting pixels horizontally and vertically adjacent to that starting point, and comparing depth values at these pixels with the depth value at that starting point pixel.

5. A method according to claim 1 wherein the identifying comprises identifying four starting points, located respectively at different corners of each tile.

6. A method according to claim 1 further comprising selecting further starting point pixels in areas, within a particular tile, in which pixels are not assigned to any of the geometrical planes, and the method of claim 1 is repeated so as to assign previously unassigned pixels to further geometrical planes defined based on the further starting point pixels and depth values associated with those further starting point pixels.

7. A method according to claim 1 in which the association of pixels to geometrical planes is performed, for multiple of the plurality of starting point pixels in a tile, in parallel.

8. A method according to claim 1, in which the association of pixels to geometrical planes is performed, for more than one pixel in a tile, in parallel.

9. A method according to claim 1 further comprising compressing and storing stencil values along with the depth values.

10. A method according to claim 9 in which the compression of stencil values is performed using run length encoding.

11. A method for decompressing depth buffer data compressed using the method of claim 1 comprising, for each tile:

reading the compressed depth data for all geometrical planes in the tile;

using plane assignment data from the compressed depth data to determine which pixels in the tile are assigned to any of the geometrical planes;

reading any uncompressed depth data for pixels in the tile that were not assigned to any of the geometrical planes;

extrapolating, for each pixel in the tile that was assigned to a geometrical plane, depth values for those pixels from the compressed depth data, based on a respective depth at a starting point of a geometrical plane to which that pixel belongs and the depth change data; and providing a set of uncompressed depth values for the pixels in the rectangular tile.

12. A method according to claim 1, wherein, for a tile, at least two different pixels are respectively assigned to at least two different geometrical planes.

13. Apparatus for compressing depth buffer data in a 3-dimensional computer graphics system comprising:

a depth buffer compressor configured to identify a plurality of starting point pixels for each tile, of a plurality of tiles in an image, for which depth data is to be compressed;

a z buffer compressor configured to:

for each starting point pixel of the plurality of starting point pixels in each tile, determine a difference in depth between a depth value at the starting point pixel of the plurality of starting point pixels in the tile, and depth values at a respective plurality of other pixels in that tile to determine changes in depth for x and y directions of the tile;

predict a depth value at a plurality of other pixels in the tile from the determined changes in depth for the x and y directions of the tile;

determine whether a predicted depth value substantially matches an actual depth value for each pixel of said plurality of other pixels, and where there is a substantial match assigning that pixel to a geometrical plane associated with the starting point pixel; and identify pixels in a tile that are not assigned to any of the geometrical planes; and store, for each tile:

for each of the geometrical planes, the starting point pixel and depth data, depth change data, and plane assignment data, the plane assignment data indicating which pixels in the tile are assigned to that geometrical plane, and depth values for pixels in the tile not assigned to any geometrical plane.

14. Apparatus according to claim 13 in which differences between predicted depth values and actual depth values which are below a threshold are considered to be substantial matches.

15. Apparatus according to claim 14 in which the differences between depth values which are below a threshold are stored as a sparse matrix.

16. Apparatus according to claim 13 in which the depth buffer compressor is further configured for selecting the respective plurality of other pixels as pixels that are horizontally and vertically adjacent to the starting point, and to compare depth values at these pixels with the depth value at the starting point pixel.

17. Apparatus according to claim 13 in which the plurality of starting point pixels are at corners of each tile.

18. Apparatus according to claim 13 in which the depth buffer compressor is configured to select further starting point pixels in areas of unassigned pixels within a tile.

19. Apparatus according to claim 13 in which the depth buffer compressor is configured to assign each starting pixel a precedence value.

20. Apparatus according to claim 19 in which the assignment of pixels to geometrical planes is performed for more than one of the plurality of starting points in a tile in parallel, and the depth buffer compressor is further configured to reassign a pixel already assigned to a geometrical plane to a different geometrical plane whose starting pixel has a higher precedence.

21. Apparatus according to claim 13 in which the assignment of pixels to geometrical planes is performed for more than one pixel in a tile in parallel.

* * * * *